(12) United States Patent
Ohata

(10) Patent No.: US 9,781,303 B2
(45) Date of Patent: Oct. 3, 2017

(54) IMAGE PROCESSING APPARATUS FOR ENABLING USER AUTHORIZATION BASED ON STORED AUTHENTICATION INFORMATION TRANSMITTED FROM A TERMINAL DEVICE, AND IMAGE PROCESSING SYSTEM

(71) Applicant: KONICA MINOLTA, INC., Chiyoda-ku, Tokyo (JP)

(72) Inventor: Tsutomu Ohata, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/069,768

(22) Filed: Mar. 14, 2016

(65) Prior Publication Data

US 2016/0286086 A1   Sep. 29, 2016

(30) Foreign Application Priority Data

Mar. 25, 2015   (JP) .................................. 2015-062397

(51) Int. Cl.
*H04N 1/44* (2006.01)
*H04N 1/00* (2006.01)

(52) U.S. Cl.
CPC ....... *H04N 1/4413* (2013.01); *H04N 1/00204* (2013.01); *H04N 1/00307* (2013.01);
(Continued)

(58) Field of Classification Search
None
See application file for complete search history.

(56) References Cited

U.S. PATENT DOCUMENTS 8,493,582 B2    7/2013  Murakami
2006/0055783 A1 3/2006  Kawamura et al.
(Continued)

FOREIGN PATENT DOCUMENTS

JP   2006085351 A   3/2006
JP   2007181154 A   7/2007
(Continued)

OTHER PUBLICATIONS

Japanese Office Action (and English translation thereof) dated Feb. 14, 2017, issued in counterpart Japanese Application No. 2015-062397.

*Primary Examiner* — Andrew H Lam
(74) *Attorney, Agent, or Firm* — Holtz, Holtz & Volek PC

(57) ABSTRACT

A terminal device writes authorization information into a storing unit of an image processing apparatus irrespective of whether power is supplied to the image processing apparatus. A control unit of the image processing apparatus starts the image processing apparatus, performs user authorization using the authorization information, and enters a standby state upon start of supply of power by a power supply unit in the case where the authorization information is written. The control unit starts the image processing apparatus and enters the standby state without performing the user authorization upon the start of supply of power by the power supply unit in the case where the authorization information is not written. When the terminal device writes the authorization information into the storing unit with the image processing apparatus being supplied with power, the control unit performs the user authorization.

17 Claims, 15 Drawing Sheets

(52) U.S. Cl.
CPC ..... *H04N 1/00411* (2013.01); *H04N 1/00896* (2013.01); *H04N 2201/006* (2013.01); *H04N 2201/0094* (2013.01)

(56) References Cited

U.S. PATENT DOCUMENTS

| | | | |
|---|---|---|---|
| 2006/0290680 A1* | 12/2006 | Tanaka | H04N 1/00204 345/173 |
| 2007/0220269 A1 | 9/2007 | Suzuki | |
| 2009/0262389 A1 | 10/2009 | Tamada | |
| 2014/0092417 A1* | 4/2014 | Kuroishi | H04N 1/00342 358/1.14 |
| 2015/0036166 A1 | 2/2015 | Kadota | |

FOREIGN PATENT DOCUMENTS

| | | | |
|---|---|---|---|
| JP | 2007267369 A | | 10/2007 |
| JP | 2009260629 A | | 11/2009 |
| JP | 2010128555 A | | 6/2010 |
| JP | 2012040820 A | * | 3/2012 |
| JP | 2013126213 A | | 6/2013 |
| JP | 2014178778 A | | 9/2014 |
| JP | 2015030135 A | | 2/2015 |

\* cited by examiner

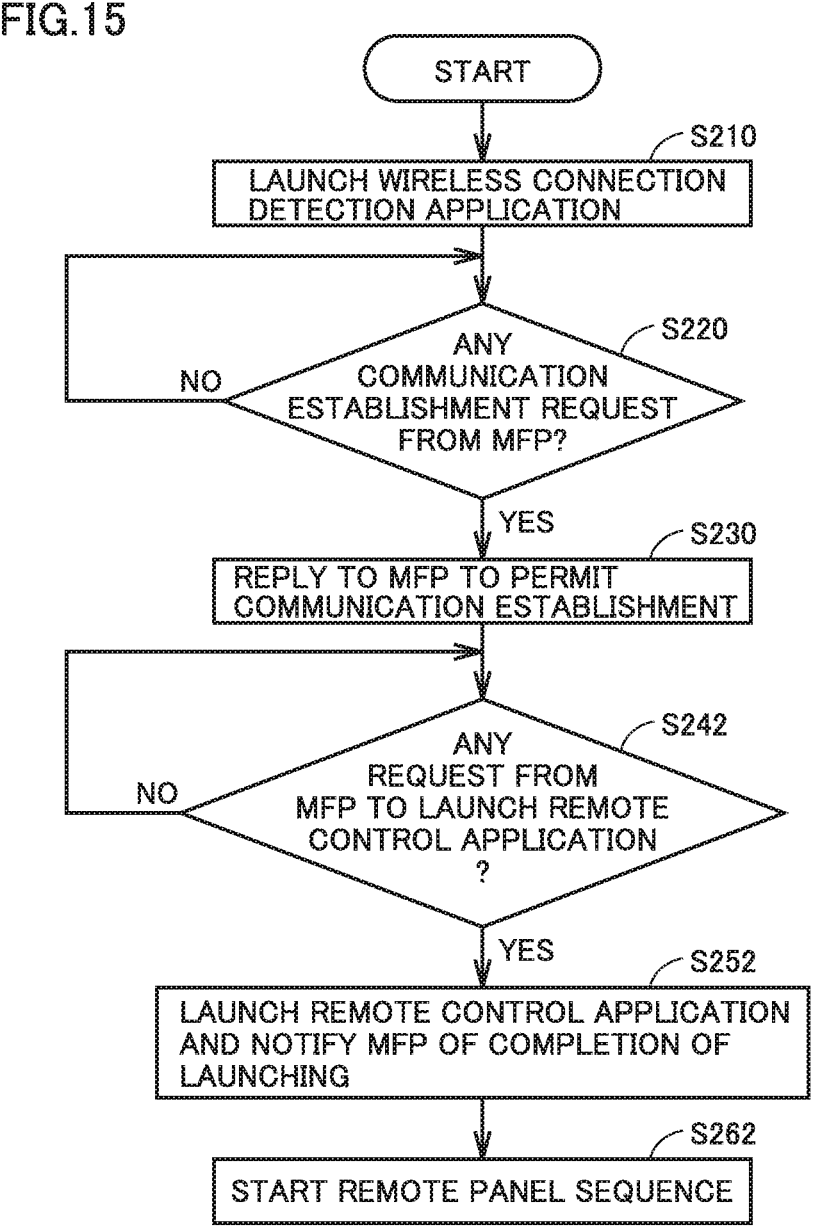

IMAGE PROCESSING APPARATUS FOR ENABLING USER AUTHORIZATION BASED ON STORED AUTHENTICATION INFORMATION TRANSMITTED FROM A TERMINAL DEVICE, AND IMAGE PROCESSING SYSTEM

This application is based on Japanese Patent Application No. 2015-062397 filed with the Japan Patent Office on Mar. 25, 2015, the entire content of which is hereby incorporated by reference.

BACKGROUND OF THE INVENTION

Field of the Invention

The present disclosure relates to an image processing apparatus that performs user authorization, an image processing system including such an image processing apparatus, and a storage medium.

Description of the Related Art

In recent years, a terminal device, such as a smartphone or a tablet terminal, is provided with a short distance communication function employing a technique such as NFC (Near Field Communication). Such a terminal device performs data communication with an image processing apparatus such as MFP (Multi-Functional Peripheral) when the terminal device is held on/over a predetermined position of the image processing apparatus. The image processing apparatus may perform user authorization through such short distance communication with the terminal device.

Regarding user authorization in an information processing apparatus, an information processing system is disclosed in Japanese Laid-Open Patent Publication No. 2012-040820, for example. In the system, when a terminal device is brought in touch with a data reading device, the data reading device instructs an information processing apparatus to return from a power saving mode, and stores authorization information, read from the terminal device, until the returning of the information processing device.

The following discusses a relation between waiting time of the user of the terminal device and consumed power when the terminal device requests the image processing apparatus for authorization. If the image processing apparatus is always supplied with power, the image processing apparatus can immediately start a process corresponding to the request of authorization upon reception of the request of authorization. That is, if the image processing apparatus is always supplied with power, the user requesting authorization is not kept waiting by the image processing apparatus. In such a case, however, power needs to be supplied to the image processing apparatus even when the image processing apparatus is not performing image processing. Therefore, consumption of power cannot be suppressed in the image processing apparatus.

Meanwhile, in a system described in Japanese Laid-Open Patent Publication No. 2012-040820, an information processing apparatus is maintained in a power saving mode. However, in order to respond to an authorization request from a terminal device without keeping a user of the terminal device waiting, a data reading device needs to be always supplied with power. Therefore, consumption of power cannot be suppressed in the data reading device.

SUMMARY OF THE INVENTION

In view of the above-mentioned circumstances, when authorization is requested from a terminal device to an image processing apparatus, it is desired to suppress consumption of power in the image processing apparatus while suppressing waiting time of the user of the terminal device.

According to a certain aspect of the present disclosure, an image processing apparatus is provided. The image processing apparatus includes: a first communication unit for performing wireless communication with a terminal device; a control unit configured to perform user authorization; and a power supply unit for supplying power to the control unit and the first communication unit. The first communication unit includes a storing unit. The control unit uses authorization information written into the storing unit by the terminal device irrespective of whether or not the first communication unit is supplied with power by the power supply unit. The control unit is configured to determine whether or not the authorization information is written in the storing unit upon start of supply of power by the power supply unit. The control unit is configured to start the image processing apparatus, execute the user authorization using the authorization information, and enter an standby state upon the start of supply of power by the power supply unit in a case where the authorization information is written in the storing unit. The control unit is configured to stall the image processing apparatus and enter the standby state without performing the user authorization upon the start of supply of power by the power supply unit in a case where the authorization information is not written in the storing unit. The control unit is configured to perform the user authorization when the terminal device writes the authorization information into the storing unit with the first communication unit being supplied with power by the power supply unit.

According to another aspect of the present disclosure, there is provided an image processing system including an image processing apparatus and a terminal device capable of communicating with the image processing apparatus. The image processing apparatus includes a first communication unit for performing wireless communication with a terminal device, a first control unit for performing user authorization, and a power supply unit for supplying power to the first communication unit. The first communication unit has a storing unit. The terminal device includes a second control unit configured to write, into the storing unit, authorization information used by the first control unit, irrespective of whether or not the first communication unit is supplied with power by the power supply unit. The first control unit is configured to determine whether or not the authorization information is written in the storing unit upon start of supply of power by the power supply unit. The first control unit is configured to start the image processing apparatus, execute the user authorization using the authorization information, and enter an standby state upon the start of supply of power by the power supply unit in a case where the authorization information is written in the storing unit. The first control unit is configured to start the image processing apparatus and enter the standby state without performing the user authorization upon the start of supply of power by the power supply unit in a case where the authorization information is not written in the storing unit. The first control unit is configured to perform the user authorization when the terminal device writes the authorization information into the storing unit with the first communication unit being supplied with power by the power supply unit.

According to still another aspect of the present disclosure, there is provided a non-transitory computer-readable storage medium storing a program executed by a computer of an image processing apparatus. The image processing apparatus includes a communication unit for performing wireless communication with a terminal device. The communication unit includes a storing unit. Authorization information used by the terminal device in the user authorization is written in the storing unit, irrespective of whether or not the communication unit is supplied with power. The program causes the computer to perform the steps of determining whether or not the authorization information is written in the storing unit, upon start of supply of power to the communication unit; starting the image processing apparatus, performing the user authorization, and entering a standby state upon the start of supply of power to the communication unit in a case where it is determined that the authorization information is written in the storing unit, starting the image processing apparatus and entering the standby state without performing the user authorization upon the start of supply of power to the communication unit in a case where it is determined that the authorization information is not written in the storing unit; and performing the user authorization when the terminal device writes the authorization information into the storing unit with the communication unit being supplied with power.

The foregoing and other objects, features, aspects and advantages of the present invention will become more apparent from the following detailed description of the present invention when taken in conjunction with the accompanying drawings.

BRIEF DESCRIPTION OF THE DRAWINGS

Each of FIG. 7

FIG. 15 is a flowchart of a process performed in the terminal device of the third embodiment.

DESCRIPTION OF THE PREFERRED EMBODIMENTS

Figure 1:
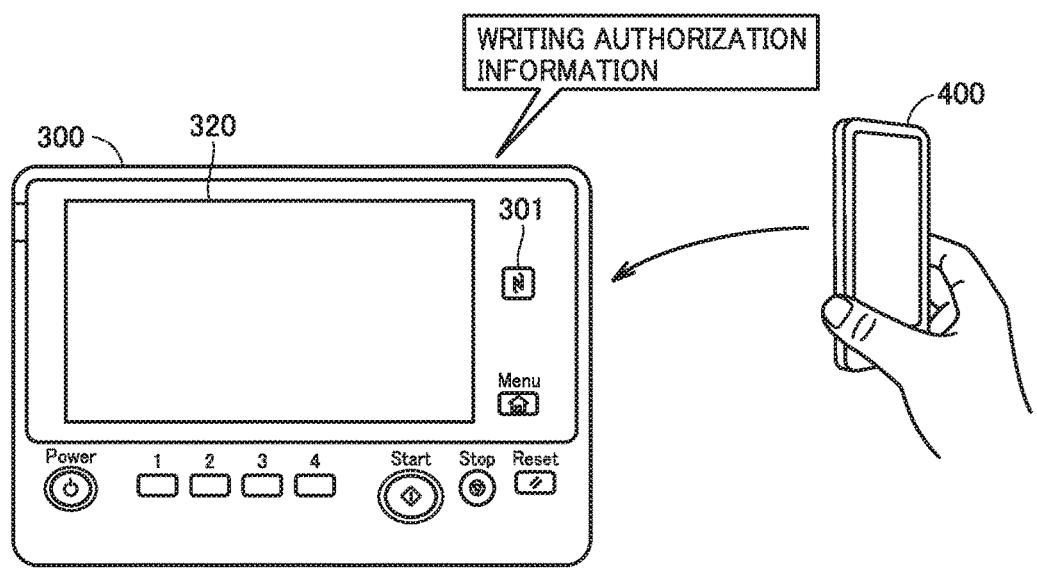
FIG. 1 illustrates an overview of a process in an image processing system of a first embodiment.

The following describes embodiments of an image processing system with reference to figures. In the description below, the same reference characters are given to the same parts and components. Their names and functions are also the same. Therefore, they are not repeatedly described.

First Embodiment (1) Overview of Process

FIG. 1 illustrates an overview of a process in an image processing system of a first embodiment. The image processing system includes: an MFP, which is an exemplary image processing apparatus; and a terminal device. FIG. 1 shows an operation panel 300 of the MFP and a terminal device 400. Operation panel 300 receives input of information and includes a display 320 for presenting the information.

In the image processing system, the MFP and terminal device 400 are capable of communicating with each other through short distance communication such as NFC. When terminal device 400 is held on/over a touch position 301 of operation panel 300 for the short distance communication, authorization information stored in terminal device 400 is written into a storing unit (storing unit 392A of FIG. 4 as described below) in operation panel 300. The authorization information at least includes information (for example, user name and password) used for user authorization. Moreover, the authorization information includes information (for example, communication address of terminal device 400) used to establish communication after the user authorization. The "communication after the user authorization" is based on a communication method allowing for communication in a communication distance longer than that in the short distance communication. If power is supplied upon writing of the authorization information, the MFP uses the authorization information to start a process for performing user authorization.

On the other hand, if power is not supplied upon the writing of the authorization information and power is then supplied, the MFP starts the process for performing user authorization using the authorization information without input of a particular instruction after an initializing process upon starting thereof. Thus, once the user holds terminal device 400 on/over the MFP, the user can cause the MFP to perform the process of user authorization.

(2) Appearance of MFP

Figure 2:
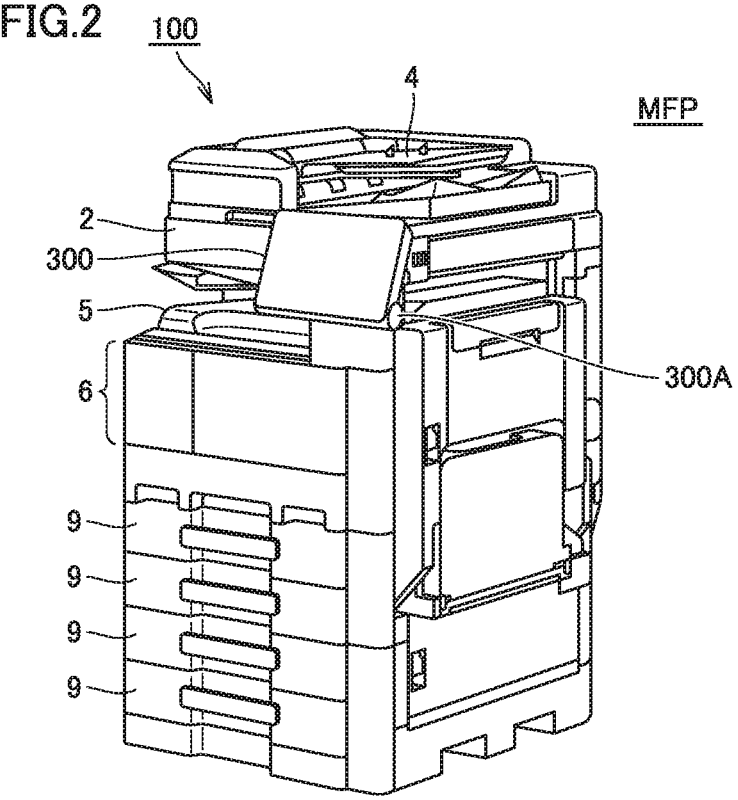
FIG. 2 is a perspective view showing an entire configuration of an MFP.

FIG. 2 is a perspective view showing an entire configuration of MFP 100.

As shown in FIG. 2, MFP 100 includes: an image scanning unit 2 for optically scanning a document to obtain image data; and an image forming unit 6 for printing an image on a sheet based on the image data. On the upper surface of the main body of MFP 100, which is an image forming apparatus, a feeder 4 is provided to feed a document to image scanning unit 2. At the lower portion of MFP 100, a plurality of sheet supply units 9 are provided to supply a printing sheet to image forming unit 6. Provided at the central portion of MFP 100 is a tray 5 to which a printing sheet having an image formed thereon by image forming unit 6 is ejected.

Operation panel 300 is attached to the front surface side of the upper portion of the main body of MFP 100. Operation panel 300 is provided in the main body of MFP 100 so as to be rotatable by way of a hinge 300A.

(3) Hardware Configuration of MFP

Figure 3:
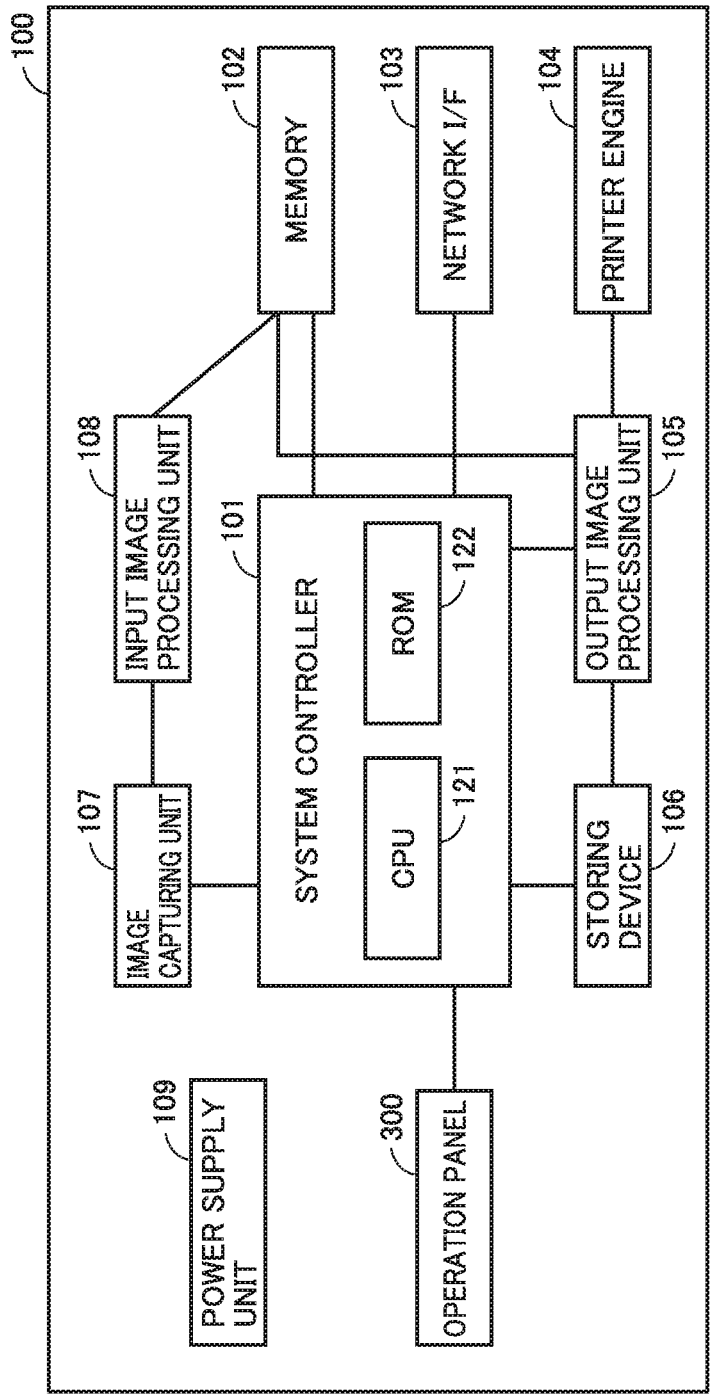
FIG. 3 is a block diagram showing the configuration of the MFP.

FIG. 3 is a block diagram showing the configuration of MFP 100.

With reference to FIG. 3, MFP 100 includes a system controller 101, a memory 102, a network interface (I/F) 103, a printer engine 104, an output image processing unit 105, a storing device 106, an image capturing unit 107, an input image processing unit 108, and operation panel 300, and a power supply unit 109. System controller 101 is connected to memory 102, network interface 103, printer engine 104, output image processing unit 105, storing device 106, image capturing unit 107, input image processing unit 108, and operation panel 300 via an internal bus, for example.

Power supply unit 109 is supplied with power from an external power supply. System controller 101 controls supply of power from power supply unit 109 to each element in MFP 100. For example, when a power button in operation panel 300 is operated, system controller 101 starts supply of power from power supply unit 109 to each element in MFP 100. Then, for example, when the power button in operation panel 300 is operated again, system controller 101 stops the supply of power from power supply unit 109 to each element in MFP 100.

System controller 101 controls the whole of MFP 100 with regard to various jobs such as a scan job, a copy job, a mail transmission job, and a printing job. System controller 101 includes a CPU (Central Processing Unit) 121 and a ROM 122 (Read Only Memory).

CPU 121 executes a control program stored in ROM 122. ROM 122 stores: a various types of programs for control of operations of MFP 100; and various types of fixed data. CPU 121 performs a predetermined process to read data from memory 102 and write data into memory 102.

Memory 102 is, for example, a RAM (Random Access Memory) and is used to temporality store: data required when CPU 121 executes the control program; and image data.

Network I/F 103 communicates with an external device via a network in accordance with an instruction from system controller 101. Network I/F 103 is used for the communication in conformity with a standard such as Bluetooth®, for example.

The communication between network I/F 103 and the external device is longer in communication distance than that in short distance communication, such as NFC, performed by a short distance communication unit 391. In the present embodiment, short distance communication unit 391 is an exemplary first communication unit. Network I/F 103 is an exemplary second communication unit.

The communication between network I/F 103 and the external device is implemented in a wireless LAN, for example. One example of network I/F 103 is an interface of a wired LAN mainly used for communication between a server and a PC (personal computer). Another example of network I/F 103 is an interface of a wireless LAN mainly used for communication between a mobile terminal and a PC.

Printer engine 104 performs a printing process onto a sheet or the like based on printing data processed by output image processing unit 105. Particularly, when MFP 100 operates as a printer, printer engine 104 prints an image. On the other hand, when MFP 100 operates as a copying machine, printer engine 104 prints an image scanned by image capturing unit 107.

Upon printing an image, for example, output image processing unit 105 performs a conversion process for converting the data format of the image into a data format for printing.

Storing device 106 is, for example, a HDD (Hard Disk Drive), and stores various types of data in connection with operations of MFP 100. Further, storing device 106 may store image data for a screen to be presented on operation panel 300 of MFP 100.

Image capturing unit 107 scans the image of a document and outputs it to input image processing unit 108.

When an image is scanned by image capturing unit 107, input image processing unit 108 performs a conversion process for converting the format of the image data.

In MFP 100, the operations of MFP 100 as described in the present specification are implemented by CPU 121 executing appropriate programs. A program executed by CPU 121 may be stored in ROM 122 as described above, may be stored in storing device 106, or may be stored in a storage medium attachable to and detachable from MFP 100. The storage medium in which the program is stored is a medium for storing data in anon-volatile manner, such as a CD-ROM (Compact Disc-Read Only Memory), a DVD-ROM (Digital Versatile Disk-Read Only Memory), a USB (Universal Serial Bus) memory, a memory card, a ED (Flexible Disk), a hard disk, an SSD (Solid State Drive), a magnetic tape, a cassette tape, an MO (Magnetic Optical Disc), an MD (Mini Disc), an IC (Integrated Circuit) card (exclusive of a memory card), an optical card, a mask ROM, an EPROM, an EEPROM (Electronically Erasable Programmable Read-Only Memory), and the like.

It should be noted that the program according to the present disclosure may be configured to perform a process by invoking a necessary module of program modules provided as a part of the operating system (OS) of the computer in a predetermined sequence at a predetermined timing. In that case, the program itself does not include the module and the process is performed in cooperation with the OS. Such a program including no module can also be encompassed in the program according to the present invention.

Moreover, the program according to the present invention to be provided may be incorporated in a part of another program. Also in that case, the program itself does not include a module included in the other program, and the process is performed in cooperation with the other program. Such a program incorporated in the other program can also be encompassed in the program according to the present invention.

A program product to be provided is installed in a program storing unit such as a hard disk, and is then executed. It should be noted that the program product includes the program itself and a recording medium having the program recorded therein.

(4) Configuration of Operation Panel

Figure 4:
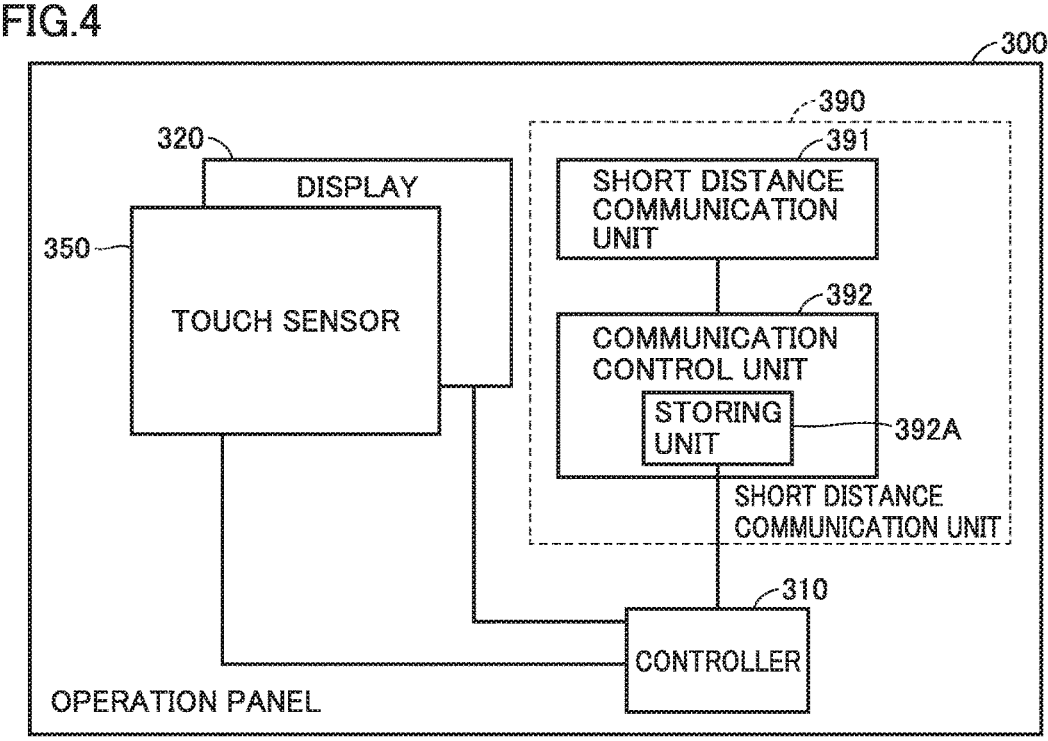
FIG. 4 is a block diagram showing a detailed configuration of an operation panel of the MFP.

FIG. 4 is a block diagram showing a detailed configuration of operation panel 300 of MFP 100.

As shown in FIG. 4, operation panel 300 includes a controller 310 for controlling the overall operation of operation panel 300. Moreover, operation panel 300 includes display 320 and a touch sensor 350. Controller 310 receives an input from touch sensor 350, and controls presentation on display 320. In operation panel 300, a touch panel is constructed by providing touch sensor 350 on display 320.

Operation panel 300 further includes short distance communication unit 390 for performing short distance communication such as NFC (which may be communication in a communication distance shorter than that in the communication performed by network I/F 103 of FIG. 3). Short distance communication unit 390 is provided in the vicinity of touch position 301 (for example, behind touch position 301). Short distance communication unit 390 includes a short distance communication unit 391 and a communication control unit 392. Short distance communication unit 390 is implemented by an NFC tag, for example. For example, short distance communication unit 391 is implemented by an antenna, whereas communication control unit 392 is implemented by an LSI (Large Scale Integrated) circuit connected to the antenna. Communication control unit 392 includes a storing unit 392A in which the "authorization information" described with reference to FIG. 1 is written. Storing unit 392A is implemented by a non-volatile RAM, for example.

In operation panel 300, controller 310 communicates with CPU 121 of system controller 101 of the main body of MFP 100. Information transmitted from controller 310 to CPU 121 includes, for example, the following information:

information input to display 320;

information received by short distance communication unit 390 from another device; and information stored in storing unit 392A.

Information transmitted from CPU 121 to controller 310 includes, for example, the following information:

information for controlling presentation on display 320; and information transmitted to another device via short distance communication unit 390.

(5) Configuration of Terminal Device

Figure 5:
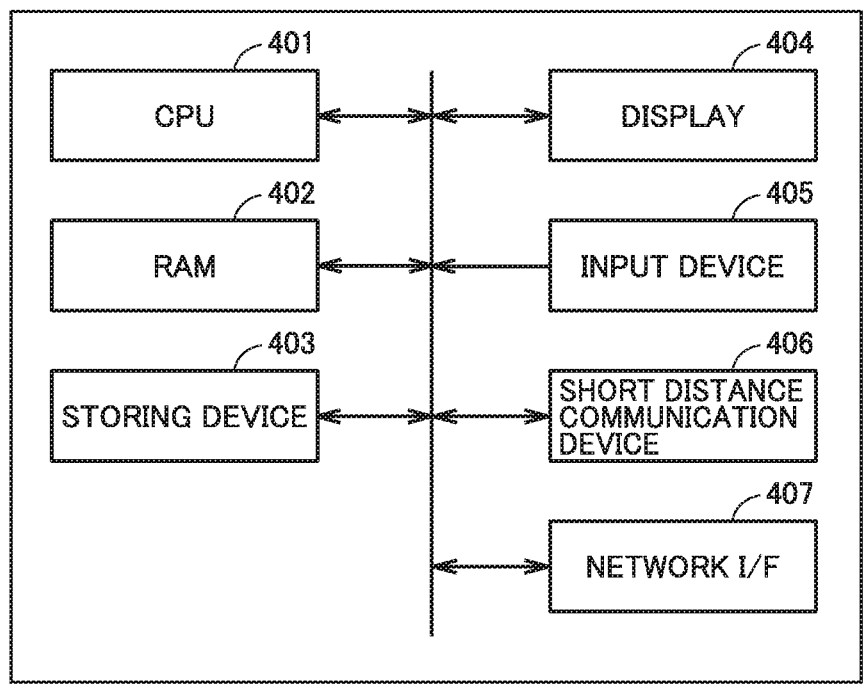
FIG. 5 shows an exemplary hardware configuration of a terminal device, which is an exemplary device with which the MFP performs short distance communication.

FIG. 5 shows an exemplary hardware configuration of terminal device 400, which is an exemplary device that performs short distance communication with MFP 100.

As shown in FIG. 5, terminal device 400 includes, as main components, a CPU 401, a RAM 402, a storing device 403, a display 404, an input device 405, a short distance communication device 406, and a network I/F 407. CPU 401, RAM 402, storing device 403, display 404, input device 405, and short distance communication device 406 are connected to one another via an internal bus.

CPU 401 is an exemplary calculation device for performing a process for controlling the overall operation of terminal device 400.

RAM 402 functions as a work area when a process is performed in CPU 401.

Storing device 403 stores: data of various types of programs such as an OS (Operating System) program and/or an application program executed by CPU 401; and data used for execution of these programs. Examples of storing device 403 include a medium that stores data in anon-volatile manner, such as an EEPROM. Moreover, a program downloaded via the network may be installed in storing device 403.

Display 404 is a display device for presenting an image indicating a process result of the program executed by CPU 401.

Input device 405 is an exemplary input device for inputting information to terminal device 400, such as input of an instruction about a process of a currently executed application. It should be noted that other examples of the input device included in terminal device 400 include a touch sensor provided on display 404.

Short distance communication device 406 is an exemplary communication device for communicating with an external device such as MFP 100 in accordance with a standard such as NFC.

Network I/F 407 is an exemplary communication device for communicating with an external device such as MFP 100 in accordance with a standard such as Bluetooth.

(6) Functional Configuration

Figure 6:
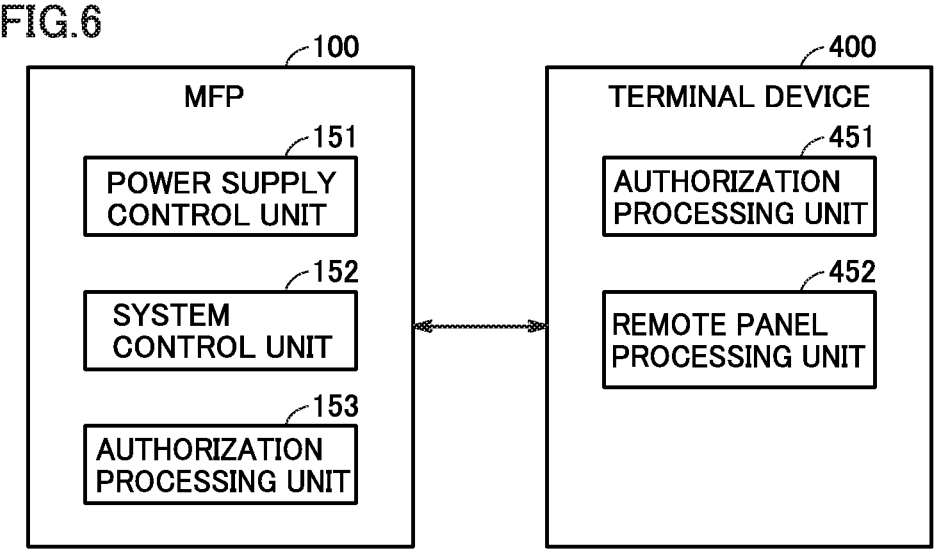
FIG. 6 illustrates a functional configuration in each of the MFP and the terminal device.

FIG. 6 illustrates a functional configuration in each of MFP 100 and terminal device 400. It should be noted that the functions shown in FIG. 6 at least includes the functions described in the present embodiment. MFP 100 and/or terminal device 400 may include functions other than the functions shown in FIG. 6.

As shown in FIG. 6, MFP 100 includes: a power supply control unit 151 for supplying each element of MFP 100 with power supplied from an external power supply to power supply unit 109; a system control unit 152 for executing an application for implementing a function to serve as a multi-functional peripheral, such as a copy function, a facsimile function, and a scanning function; and an authorization processing unit 153 for performing a process for user authorization. The user authorization refers to a process for permitting a user to use MFP 100 or a process for permitting a user to use MFP 100 in a specific manner. For example, in MFP 100, a user having succeeded in the user authorization is permitted to use a special function corresponding to the user. Specifically, for example, when user authorization is not succeeded, MFP 100 does not perform "color output". However, when user authorization is succeeded, MFP 100 performs a special process corresponding to the authorized user, such as "color output".

In MFP 100, power supply control unit 151, system control unit 152, and authorization processing unit 153 are implemented by, for example, CPU 121 (see FIG. 3) executing a given program.

On the other hand, terminal device 400 includes an authorization processing unit 451 and a remote panel processing unit 452. Authorization processing unit 451 and remote panel processing unit 452 are implemented by, for example, CPU 401 (see FIG. 5) executing a given program.

Authorization processing unit 451 performs a process for causing MFP 100 to authorize the user of terminal device 400. Authorization processing unit 451 writes the authorization information of the user of terminal device 400 into storing unit 392A (see FIG. 4) of operation panel 300, for example.

It should be noted that in MFP 100, authorization processing unit 451 can write the authorization information into storing unit 392A even when no power is supplied to each of the units including short distance communication unit 390. More specifically, for example, authorization processing unit 451 employs a magnetic field generated from short distance communication device 406 of terminal device 400 so as to operate short distance communication unit 390 to access storing unit 392A, thereby writing the authorization information into storing unit 392A. It should be noted that the user holds terminal device 400 on/over brings terminal device 400 into touch with) touch position 301 (see FIG. 1) of operation panel 300 such that CPU 401 of terminal device 400 operates short distance communication unit 390 by way of the magnetic field generated from short distance communication device 406.

Remote panel processing unit 452 performs a process for remotely controlling MFP 100. Remote panel processing unit 452 is implemented by, for example, CPU 401 executing a "remote panel application" described below. More specifically, remote panel processing unit 452 displays screen information, transmitted from MFP 100, on display 404, and transmits to MFP 100 an instruction input to input device 405.

(7) Flow of Process

Figure 7:
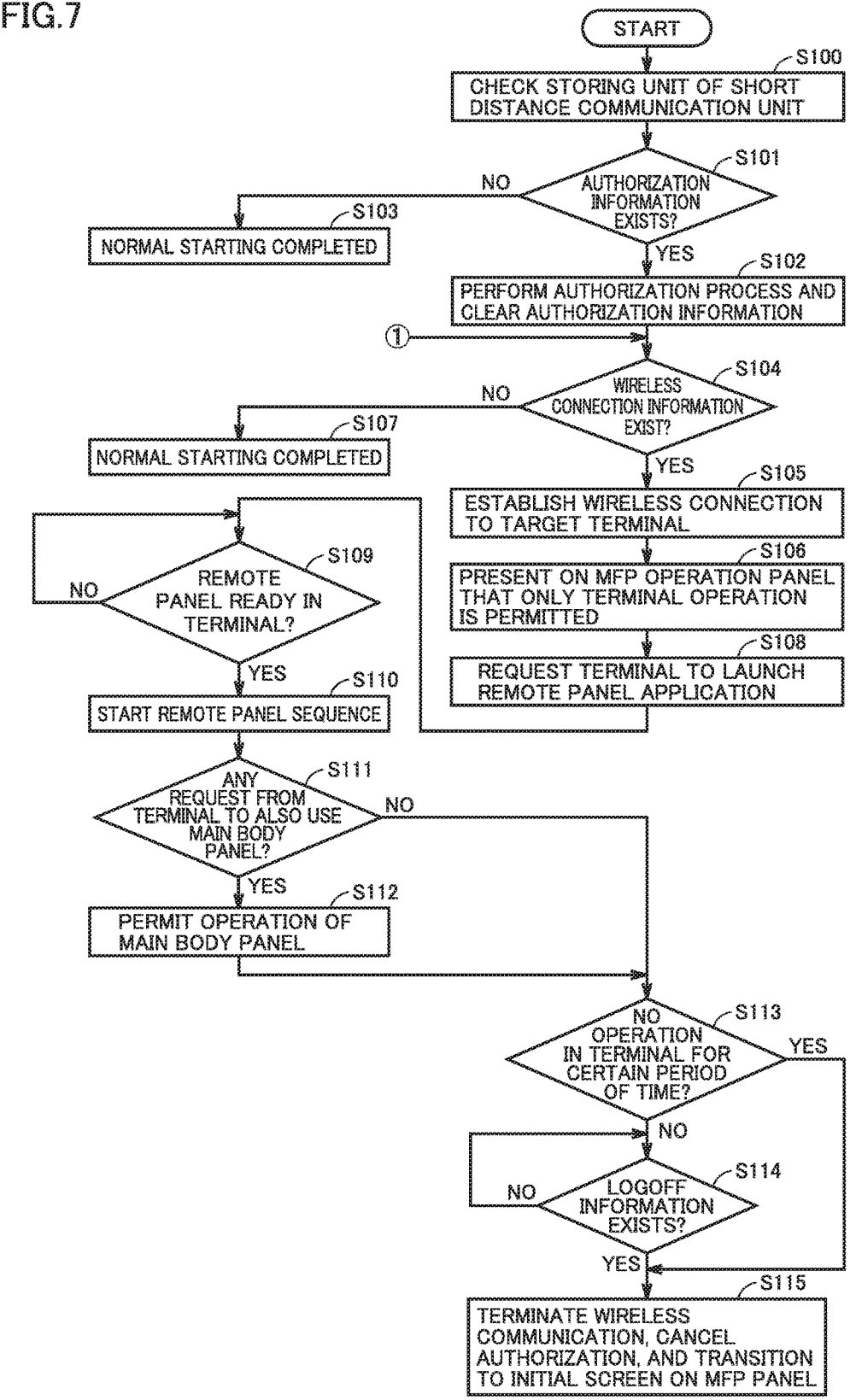
Figure 8:
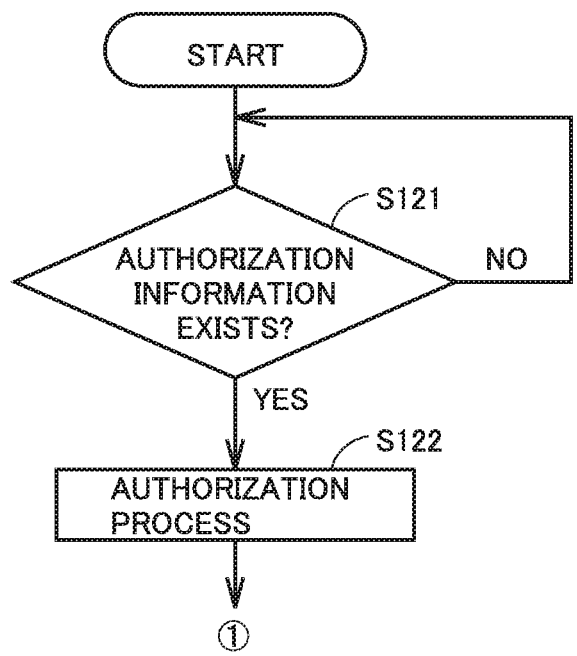
FIG. 8 is a flowchart of a process performed in the MFP.
Figure 9:
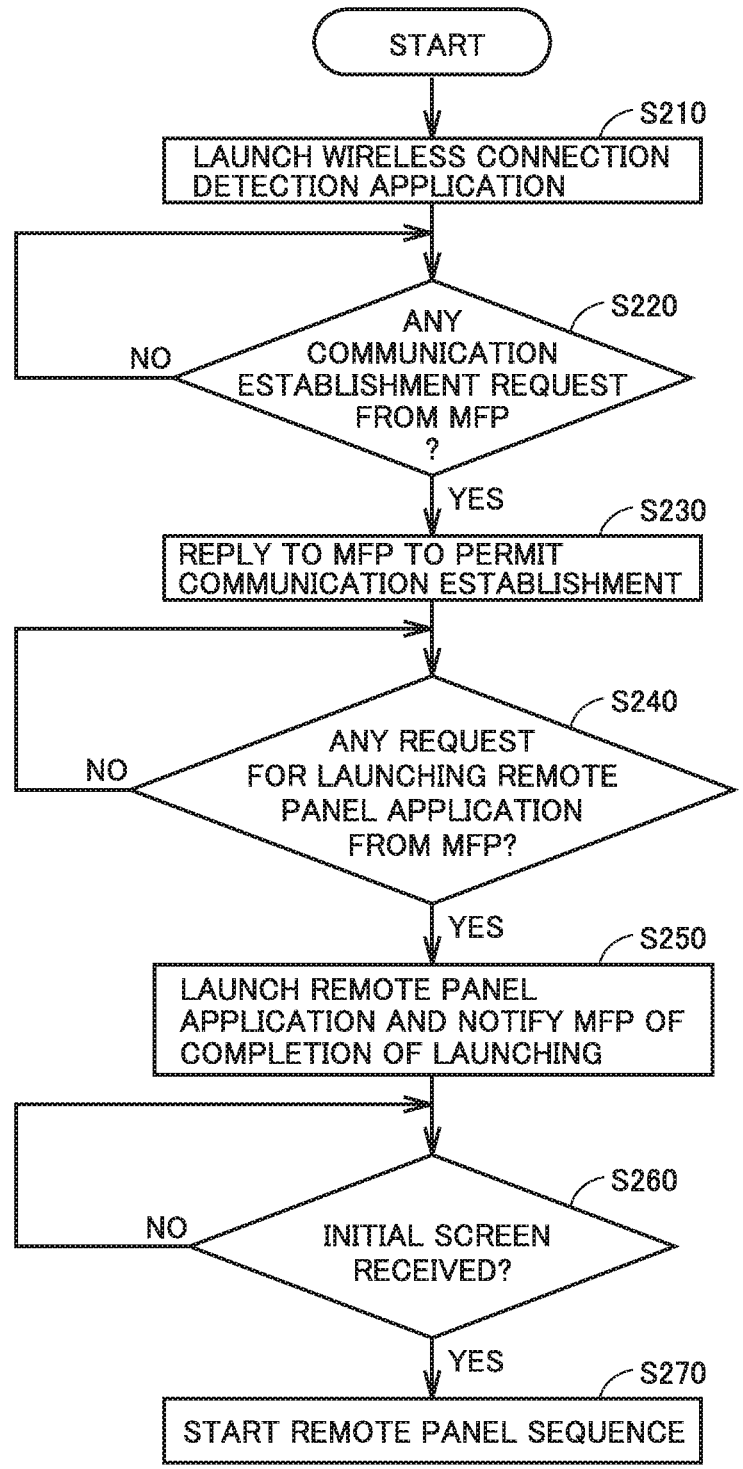
FIG. 9 is a flowchart of a process performed in the terminal device.

With reference to FIG. 7 to FIG. 9, the following describes a flow of the process for user authorization for the user of terminal device 400 in MFP 100. Each of FIG. 7 and FIG. 8 is a flowchart of a process performed in MFP 100. FIG. 9 is a flowchart of a process performed in terminal device 400.

(Process at MFP 100 Side)

FIG. 7 shows a flowchart of a process performed to authorize a user in (each unit of) MFP 100. In MFP 100, upon starting supply of power, a starting process such as initialization of each unit is performed. The process of FIG. 7 is performed, for example, in parallel with the starting process, before the starting process, or after the starting process. It should be noted that power is started to be supplied to (each unit of) MFP 100 when the power button, which is provided in MFP 100, is operated. It should be noted that when the power button is operated again the supply of power to (each unit of) MFP 100 is stopped.

As shown in FIG. 7, first, in a step S100, CPU 121 (see FIG. 3) checks a stored content in storing unit 392A (see FIG. 4) of short distance communication unit 390. Then, the control proceeds to a step S101.

In step S101, CPU 121 determines whether authorization information is stored in storing unit 392A. When CPU 121 determines that authorization information is stored in storing unit 392A (YES in step S101), the control proceeds to a step S102. On the other hand, when CPU 121 determines that the authorization information is not stored in storing unit 392A (NO in step S101), the control proceeds to a step S103.

In step S103, CPU 121 enters a standby state after the starting process of MFP 100. After this, a normal operation is performed. In the normal operation, for example, CPU 121 displays a standby image on operation panel 300 and then controls an operation of each element in MFP 100 in accordance with an input from operation panel 300.

On the other hand, in step S102, CPU 121 performs the process of user authorization using the authorization information stored in storing unit 392A. When the user authorization is succeeded, MFP 100 is brought into a state in which a special function corresponding to the user (user of terminal device 400) having been subjected to the user authorization can be used. After reading the authorization information for the user authorization process, CPU 121 deletes (clears) the authorization information stored in storing unit 392A. Then, the control proceeds to a step S104.

In step S104, CPU 121 determines whether or not the authorization information read in step S102 includes information (for example, the network address of terminal device 400) for attaining wireless connection (wireless communication employing a communication method allowing for communication in a longer communication distance than that in the short distance communication) by network I/F 103 (see FIG. 3). When CPU 121 determines that the authorization information includes the information for wireless connection (YES in step S104), the control proceeds to a step S105. On the other hand, when CPU 121 determines that the authorization information does not include the information for wireless connection (NO in step S104), the control proceeds to a step S107.

In step S107, CPU 121 enters the standby state after the starting process of MFP 100 as with step S103.

On the other hand, in step S105, CPU 121 uses the information for wireless connection included in the authorization information, to establish wireless connection to the target terminal (terminal device 400). More specifically, CPU 121 requests terminal device 400 to establish wireless connection by using network 103. When CPU 121 receives a reply from terminal device 400 via network UP 103 to permit establishment of wireless connection, wireless communication such as Bluetooth is established between MFP 100 and terminal device 400. Then, the control proceeds to a step S106.

In step S106, CPU 121 changes a setting for input of instruction information in MFP 100. More specifically, CPU 121 performs a setting in which an instruction input from operation panel 300 is not accepted and an instruction input from terminal device 400 is accepted. That is, input of instruction to operation panel 300 is prohibited. Moreover, in step S106, CPU 121 provides a presentation on operation panel 300 to indicate that such a setting is being performed. Then, the control proceeds to a step S108.

In step S108, CPU 121 requests terminal device 400 to launch a remote panel application. The "remote panel application" is an application for remotely controlling MFP 100. Then, the control proceeds to a step S109.

In step S109, CPU 121 determines whether or not the remote panel application is ready in terminal device 400. In step S109, for example, CPU 121 determines whether or not in reply to the request in step S108, there is a response from terminal device 400 to indicate that the application has been launched. Then, CPU 121 keeps the control in step S109 until it is determined that there is the response from terminal device 400 (NO in step S109) When it is determined that there is the response (YES in step S109), the control proceeds to a step S110.

In step S110, CPU 121 starts a remote panel sequence. Accordingly, CPU 121 accepts input of instruction information for MFP 100 from terminal device 400. In the remote panel sequence, for example a screen that should be presented on operation panel 300 is presented on display 404 of terminal device 400. Then, the control proceeds to a step S111.

Figure 10:
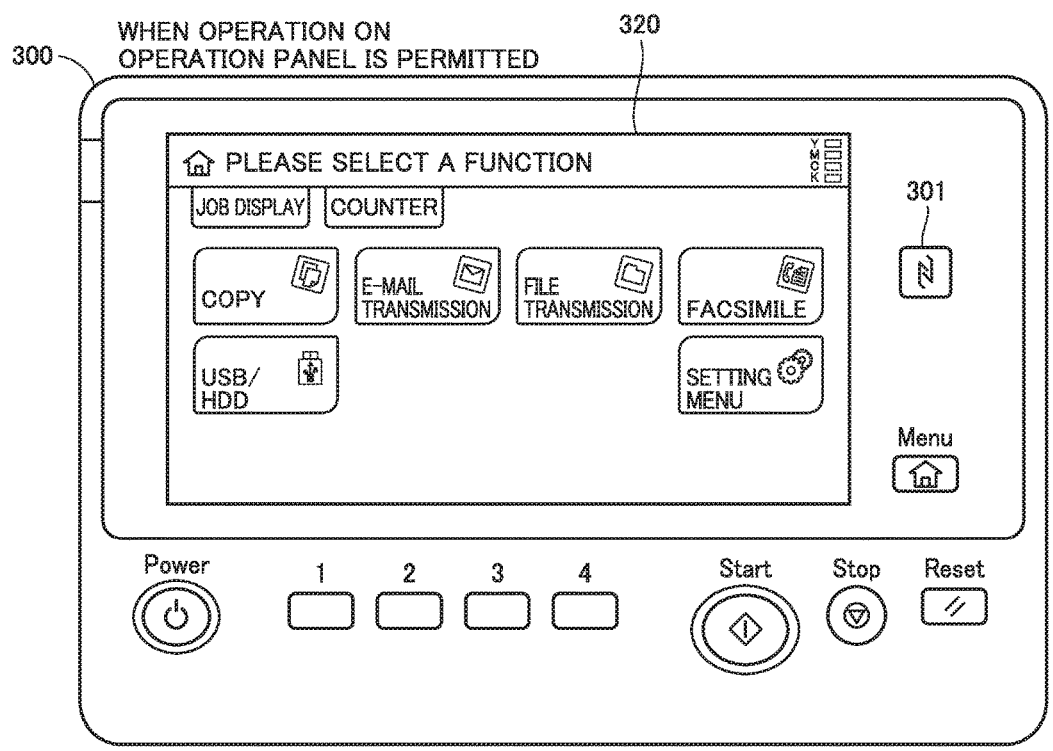
FIG. 10 illustrates a content presented in the operation panel in accordance with a setting for a manner of input of instruction information in the MFP.
Figure 11:
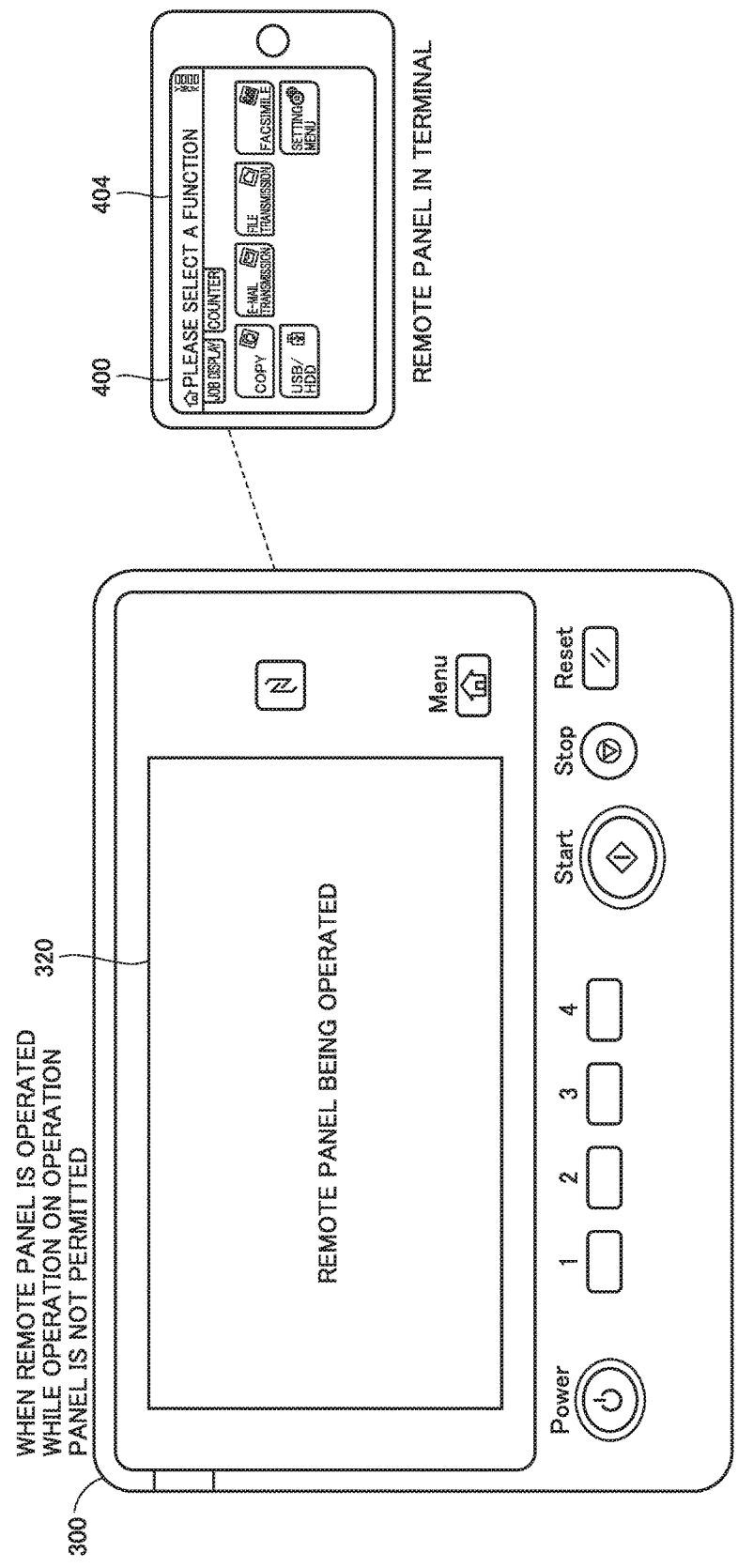
FIG. 11 illustrates a content presented in the operation panel in accordance with a setting for a manner of input of instruction information in the MFP.

Here, with reference to FIG. 10 and FIG. 11, the following describes presentation in MFP 100 in accordance with the process of each of step S106 and steps S108 to S110. Each of FIG. 10 and FIG. 11 illustrates contents presented on operation panel 300 in accordance with a setting for a manner of input of the instruction information in MFP 100.

FIG. 10 shows exemplary presentation on display 320 of operation panel 300 when accepting an instruction input from operation panel 300. Display 320 of FIG. 10 presents a message "PLEASE SELECT A FUNCTION" as well as icons for designating functions to be performed by MFP 100 (such as "copy", "E-mail transmission", "file transmission", and "facsimile").

On the other hand, FIG. 11 shows exemplary presentation display 320 of operation panel 300 when an instruction input from operation panel 300 is not accepted. Display 320 of FIG. 11 presents a message "REMOTE PANEL BEING OPERATED". The presentation in FIG. 11 is exemplary presentation indicating that the setting of "not accepting an instruction input from operation panel 300 and accepting an instruction input from terminal device 400" in step S106 is being performed.

Furthermore, FIG. 11 shows presentation on terminal device 400. The presentation on display 404 as shown in FIG. 11 is an exemplary screen presented on display 404 of terminal device 400 in the remote panel sequence.

Display 404 of FIG. 11 presents a screen that emulates the screen (see FIG. 10) presented on display 320, for example. For example, CPU 121 generates data (for example, data compressed in JPEG format) for presenting the screen that emulates the screen that should be presented on display 320, and transmits the data to terminal device 400. CPU 401 of terminal device 400 generates presentation information using the data, thereby presenting the screen of FIG. 11 on display 404. It should be noted that when a hardware button (mechanical key) is included in operation panel 300, the screen presented on display 404 may include a software button corresponding to the hardware button.

Turning back to FIG. 7, in a step S111, CPU 121 determines whether or not terminal device 400 (remote panel) transmits information requesting to also use the main body panel (operation panel 300 of MFP 100). When CPU 121 determines that the information is received from terminal device 400 (YES in step S111), the control proceeds to a step S112. On the other hand, when CPU 121 determines that the information is not received (NO in step S111), the control proceeds to a step S113. It should be noted that the control also proceeds to step S113 by CPU 121 when information requesting not to also use the main body panel is received from terminal device 400.

In step S112, CPU 121 performs control for permitting use of the main body panel (operation panel 300) and the control proceeds to a step S113. An example of the control for permitting use of the main body panel is as follows: an operation screen such as the one shown in FIG. 10 is presented on operation panel 300, and control is performed in accordance with an input to operation panel 300, for example.

In step S113, CPU 121 determines whether or not a state involving no operation in terminal device 400 is continued for a certain period of time or longer, i.e., determines whether or not a state involving no reception of input from terminal device 400 with regard to the remote panel application is continued for the certain period of time or longer. When no instruction with regard to the remote panel application is received from terminal device 400 for the certain period of time or longer (YES in step S113), the control proceed to a step S114 by CPU 121. On the other hand, when CPU 121 determines that such a state has not occurred (NO in step S113), the control proceeds to a step S114 while performing a process corresponding to the instruction from terminal device 400.

In step S114, CPU 121 determines whether or not information (logoff information) instructing logoff is received from terminal device 400. CPU 121 keeps the control in step S114 until logoff information is received from terminal device 400 (NO in step S114). When logoff information is received (YES in step S114), the control proceeds to a step S115.

In step S115, CPU 121 terminates the wireless communication with terminal device 400, cancels the user authorization performed in step S102, and presents the initial screen on operation panel 300, thus ending the process of FIG. 7. In MFP 100, the control of step S115 cancels the state in which the special function corresponding to the user of terminal device 400 is performed. Moreover, the control of step S115 brings MFP 100 into such a state that MFP 100 accepts an instruction input from operation panel 300.

In the process of FIG. 7 described above, if authorization information is written in storing unit 392A (see FIG. 4) when power is started to be supplied to MFP 100, initialization (normal starting process) and user authorization employing the authorization information are performed step S102). By performing the user authorization, the authorization information is deleted from storing unit 392A (step S102). On the other hand, if no authorization information is written in storing unit 392A, only the normal starting process is performed (step S103).

It should be noted that if authorization information is written from terminal device 400 after performing the normal starting process in MFP 100, CPU 121 of MFP 100 performs user authorization using the authorization information. This process will be described with reference to FIG. 8.

FIG. 8 shows a flowchart of a process performed in MFP 100 having been through the normal starting process (step S103, S107). The process of FIG. 8 is performed regularly (once in 1 second) in MET 100 having not authorized a user.

As shown in FIG. 8, in a step S121, CPU 121 determines whether or not authorization information is written into storing unit 392A. CPU 121 keeps the control in step S121 until CPU 121 determines that authorization information is written into storing unit 392A (NO in step S121). When CPU 121 determines that authorization information is written into storing unit 392A (YES in step S121), the control proceeds to a step S122.

In step S122, CPU 121 performs user authorization using the authorization information written in storing unit 392A. Then, CPU 121 performs the control in and subsequent to step S104 of FIG. 7.

As shown in FIG. 8, if no authorization information is written upon starting supply of power to MFP 100 but authorization information is then written into storing unit 392A, CPU 121 performs user authorization using the authorization information.

(Process at Terminal Device 400 Side)

FIG. 9 shows a flowchart of a process performed in terminal device 400 to remotely control MFP 100.

As shown in FIG. 9, in a step S210, CPU 401 launches a wireless connection detection application. The "wireless connection detection application" is an application for managing establishment of communication between terminal device 400 and another device. Then, the control proceeds to a step S220. It should be noted that in terminal device 400, the wireless connection detection application may be executed regularly.

In step S220, CPU 401 determines whether or not a communication establishment request is received from MFP 100. Existence/non-existence of the request is detected by way of a function of the wireless connection detection application, for example. CPU 401 keeps the control in step S220 until it is determined that the request is received (NO in step S220). When CPU 401 determines that the request is received (YES in step S220), the control proceeds to a step S230.

In step S230, CPU 401 provide a reply to MFP 100 that the communication establishment is permitted. It should be noted that before the reply in step S230, CPU 401 may provide the reply under conditions that terminal device 400 accepts input of information permitting the reply and that the information is input. Then the control proceeds to a step S240.

In step S240, CPU 401 determines whether or not the request for launching the remote panel application (step S108 of FIG. 7) is received from MFP 100. CPU 401 keeps the control in step S240 until it is determined that the request is received (NO in step S240). When CPU 401 determines that the request is received (YES in step S240), the control proceeds to a step S250.

In step S250, CPU 401 launches the remote panel application, and when the launching is completed, CPU 401 notifies MFP 100 of the completion. Then, the control proceeds to a step S260.

In step S260, CPU 401 determines whether or not the data for presenting the initial screen that should be presented in MFP 100 is received from MFP 100. CPU 401 keeps the control in step S260 until it is determined that the data is received (NO in step S260). When CPU 401 determines that the data is received (YES in step S260), the control proceeds to a step S270.

In step S270, CPU 401 executes the remote panel sequence (step S110 of FIG. 7) in conjunction with MFP 100.

In the image processing system of the first embodiment described above, by holding terminal device 400 on/over touch position 301 (see FIG. 1) of MFP 100 before starting to supply power to MFP 100, the authorization information in terminal device 400 is written into storing unit 392A in operation panel 300. Then, when the user operates the power button of MFP 100 to start supply of power to MFP 100, user authorization is performed in MFP 100 even without any particular operation from the user. Accordingly, upon completion of the starting of MFP 100, the user has been already authorized in MFP 100.

Second Embodiment

An image processing system of a second embodiment includes MFP 100 and terminal device 400 as with the image processing system of the first embodiment. In the second embodiment, the hardware configuration of each of MFP 100 and terminal device 400 can be the same as that in the first embodiment.

Figure 12:
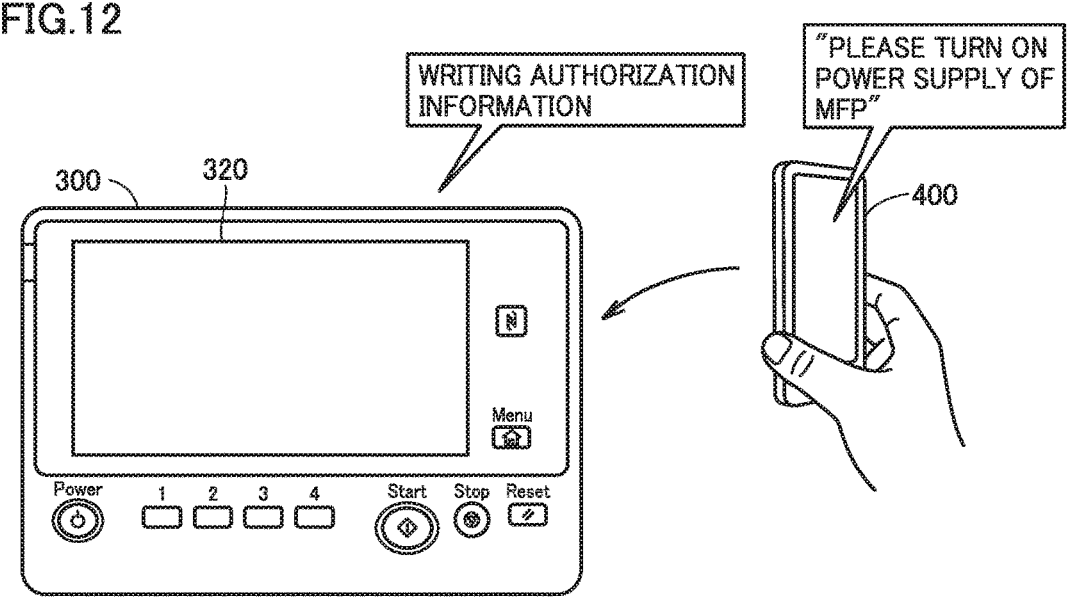
FIG. 12 shows an overview of a process of an image processing system of a second embodiment.

FIG. 12 shows an overview of a process of the image processing system of the second embodiment. As shown in FIG. 12, in the image processing system of the second embodiment, if power is not supplied to MFP 100 when terminal device 400 is held on/over touch position 301 (if MFP 100 is in the power off state), terminal device 400 writes the authorization information stored in terminal device 400 into storing unit 392A of MFP 100, and presents a message urging to supply power to MFP 100.

As one example of the configuration for implementing such control, a flag indicating a power supply state in MFP 100 (hereinafter referred to as "power supply information flag") is provided in MFP 100 of the second embodiment. The flag is implemented by a part of storage areas of storing unit 392A (see FIG. 4), for example.

More specifically, when power is supplied to MFP 100, CPU 121 of MFP 100 (see FIG. 3) turns on the power supply information flag. On the other hand, when the supply of power to MFP 100 is ended, CPU 121 turns off the power supply information flag. When writing the authorization information into storing unit 392A, CPU 401 of terminal device 400 (see FIG. 5) determines whether the power supply information flag is on or off. When the flag is off, the above-mentioned message is presented on display 404.

In FIG. 12, as an example of the above-mentioned message, a character string "PLEASE TURN ON POWER SUPPLY OF MFP" is shown. It should be noted that the message presented is not limited to this. Moreover, instead of or in addition to the presentation of the message, the notification may be provided in a different manner, such as speech urging to turn on the power supply of MFP 100.

Figure 13:
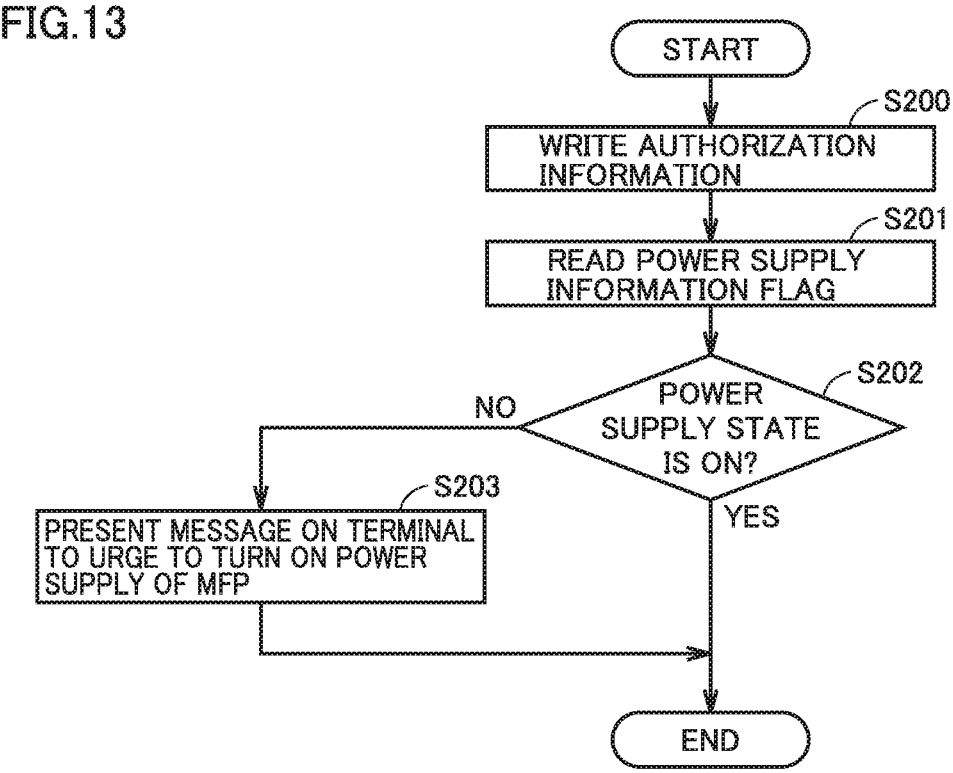
FIG. 13 is a flowchart of a process performed in a terminal device of the second embodiment when the terminal device is held on/over a touch position.

FIG. 13 is a flowchart of a process performed in terminal device 400 of the second embodiment when terminal device 400 is held on/over touch position 301. As shown in FIG. 13 in terminal device 400 of the second embodiment, in a step S200, CPU 401 writes the authorization information into storing unit 392A (see FIG. 4). In terminal device 400, the authorization information is stored in storing device 403, for example. CPU 401 reads the authorization information from storing device 403, and writes it into storing unit 392A. Even when power is not supplied to MFP 100, CPU 401 employs magnetic field generated from short distance communication device 406 so as to operate short distance communication unit 390, thereby writing the authorization information into storing unit 392A. Then, the control proceeds to a step S201.

In step S201, CPU 401 reads the power supply information flag in storing unit 392A. Then, the control proceeds to a step S202.

In step S202, CPU 401 determines a power supply state (whether or not power is supplied) of MFP 100 based on the state of the power supply information flag. When CPU 401 determines that the power supply state is on (power is supplied) (YES in step S202), CPU 401 ends the control of FIG. 13 accordingly. On the other hand, when CPU 401 determines that the power supply state is off (power is not supplied) (NO in step S202), the control proceeds to a step S203.

In step S203, CPU 401 presents the above-described message on display 404 (for example, "PLEASE TURN ON POWER SUPPLY OF MFP"), and ends the control of FIG. 13.

In the above-described image processing system of the second embodiment, if power is not supplied to MFP 100 when the user holds terminal device 400 on/over MFP 100, the message is presented to the user to urge an operation for supplying power to MFP 100. In this way, the user is urged to have a shorter waiting time until MFP 100 becomes usable.

Third Embodiment

An image processing system of a third embodiment includes MFP 100 and terminal device 400 as with the image processing system of the first embodiment. In the third embodiment, the hardware configuration of each of MFP 100 and terminal device 400 can be the same as that in the first embodiment.

In the third embodiment, terminal device 400 executes a "remote control application" instead of the "remote panel application" described in the first embodiment with reference to FIG. 7 and the like. The "remote control application" is an application for remotely controlling an operation of MFP 100. The "remote panel application" performed in the first embodiment is such that the screen information generated in MFP 100 is presented on display 404 and information input in response to such a presentation is transmitted to MFP 100. On the other hand, the "remote control application" is such that screen information to be presented on display 404 is generated at the terminal device 400 side.

Figure 14:
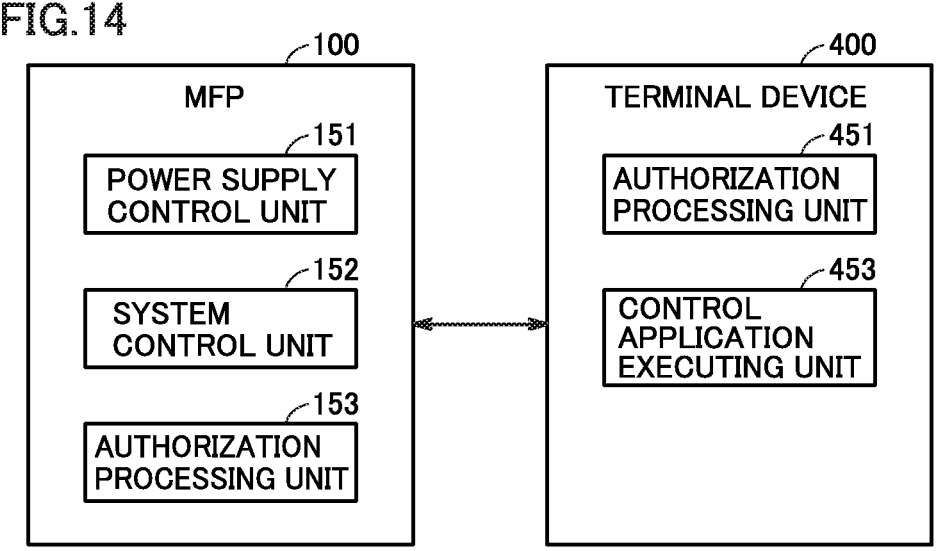
FIG. 14 shows a functional configuration of an image processing system of a third embodiment.

FIG. 14 shows a functional configuration of the image processing system of the third embodiment. In comparison with the functional configuration of the first embodiment as shown in FIG. 6, terminal device 400 of the third embodiment includes a control application executing unit 453 instead of remote panel processing unit 452 (FIG. 6). Control application executing unit 453 is implemented by CPU 121 executing the application program of the remote control application.

The following describes a process performed in the third embodiment. In the third embodiment, in step S108 (FIG. 7), CPU 121 of MFP 100 requests terminal device 400 to launch the remote control application, instead of requesting to launch the remote panel application. Moreover, in step S109, it is determined whether or not the remote control application is launched in terminal device 400, and when it is determined that the application is launched, the control proceeds to step S110. In the remote panel sequence of step S110, CPU 121 controls the operation of MFP 100 in accordance with an instruction from the remote control application of terminal device 400.

FIG. 15 is a flowchart of a process performed in terminal device 400 of the third embodiment. In comparison with the process shown in FIG. 9, in the third embodiment, after the control of step S230, CPU 401 of terminal device 400 determines in a step S242 whether or not a request to launch the remote control application is received from MFP 100. CPU 401 keeps the control in step S242 until it is determined that the request is received (NO in step S242), and when CPU 401 determines that the request is received (YES in step S242), the control proceeds to a step S252.

In step S252, CPU 401 launches the remote control application and notifies MFP 100 of the launching, and the control proceeds to a step S262.

In step S262, CPU 401 starts the remote panel sequence. In the remote panel sequence of the third embodiment, CPU 401 controls the presentation on display 404 in accordance with an input to the remote control application, and transmits the information to MFP 100.

In the third embodiment described above, it is necessary to develop the application (remote control application) dedicated to the control of MFP 100 and installed in terminal device 400. The application may need to be updated in response to a change in version of MFP 100. However, in the third embodiment, the application for control of MFP 100 is launched in terminal device 400. Hence, while MFP 100 in the first embodiment provides screen information to the remote panel application, such screen information does not need to be provided. This leads to reduced load of MFP 100 in the image processing system.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image processing apparatus comprising:
a first communication device which performs wireless communication with a terminal device;
a hardware processor configured to perform a user authorization process; and
a power supply which supplies power to the hardware processor and the first communication device,
wherein:
the first communication device includes a storage, authorization information being written into the storage by the terminal device irrespective of whether or not the first communication device is supplied with power by the power supply, and
the hardware processor is further configured to:
determine whether or not the authorization information is written in the storage upon start of supply of power by the power supply,
start the image processing apparatus, perform the user authorization process using the authorization information, and enter a standby state upon the start of supply of power by the power supply in a case where the authorization information is written in the storage, or start the image processing apparatus and enter the standby state without performing the user authorization process upon the start of supply of power by the power supply in a case where the authorization information is not written in the storage, and
perform the user authorization process when the terminal device writes the authorization information into the storage with the first communication device being supplied with power by the power supply.

2. The image processing apparatus according to claim 1, wherein:
the hardware processor is further configured to control an operation of the image processing apparatus,
the image processing apparatus further comprises an operation panel which receives input of information to the hardware processor, and
the hardware processor is further configured to:
establish communication with the terminal device when the user authorization process has succeeded, and
prohibit the input to the operation panel and control the operation of the image processing apparatus based on information input from the terminal device rather than the information input to the operation panel.

3. The image processing apparatus according to claim 2, further comprising a second communication device which performs wireless communication, a communication distance of the second communication device being longer than a communication distance of the first communication device,
wherein the hardware processor is further configured to:
obtain the authorization information and connection information for performing the wireless communication with the terminal device using the second communication device, and
establish the wireless communication with the terminal device using the second communication device based on the obtained connection information when the user authorization process has succeeded.

4. The image processing apparatus according to claim 2, wherein when the communication with the terminal device is established, the hardware processor is further configured to transmit, to the terminal device, data for implementing presentation for inputting information to the hardware processor.

5. The image processing apparatus according to claim 2, wherein the hardware processor is further configured to control the operation of the image processing apparatus in response to an instruction from the terminal device based on the information input to the operation panel.

6. The image processing apparatus according to claim 2, wherein the hardware processor is further configured to cancel execution of a function corresponding to the user authorization process and to control the operation of the image processing apparatus based on the information input to the operation panel, in a case where no information is received from the terminal device for a certain period of time or longer after establishment of the communication with the terminal device.

7. The image processing apparatus according to claim 2, wherein the hardware processor is further configured to delete the authorization information from the storage when the user authorization process is performed using the authorization information written into the storage.

8. An image processing system comprising:
an image processing apparatus; and
a terminal device capable of communicating with the image processing apparatus,
wherein the image processing apparatus includes:
a first communication device which performs wireless communication with the terminal device,
a first hardware processor configured to perform a user authorization process, and a power supply which supplies power to the first communication device, wherein the first communication device includes a storage, wherein the terminal device includes a second hardware processor configured to write, into the storage, authorization information used by the first hardware processor, irrespective of whether or not the first communication device is supplied with power by the power supply, and wherein the first hardware processor is further configured to:
- determine whether or not the authorization information is written in the storage, upon start of supply of power by the power supply,
- start the image processing apparatus, perform the user authorization process using the authorization information, and enter a standby state upon the start of supply of power by the power supply in a case where the authorization information is written in the storage, or start the image processing apparatus and enter the standby state without performing the user authorization process upon the start of supply of power by the power supply in a case where the authorization information is not written in the storage, and
- perform the user authorization process when the terminal device writes the authorization information into the storage with the first communication device being supplied with power by the power supply.

9. The image processing system according to claim 8, wherein:
the first hardware processor is further configured to:
- control an operation of the image processing apparatus, and
- store, in the storage, information indicating whether or not the first communication device is supplied with power, and the second hardware processor is further configured to notify information urging to supply power to the image processing apparatus, in a case where information indicating that the first communication device is not supplied with power is stored in the storage when the authorization information is written into the storage.

10. The image processing system according to claim 9, wherein:
the image processing apparatus further includes an operation panel which receives input of information to the first hardware processor,
the first hardware processor is further configured to establish communication with the terminal device when the user authorization process has succeeded,
the second hardware processor is further configured to execute an application for transmitting, to the image processing apparatus, information for controlling the operation of the image processing apparatus, when the communication with the image processing apparatus is established with the user authorization process having succeeded, and
the first hardware processor is further configured to prohibit input to the operation panel when the communication with the terminal device is established in response to the user authorization process having succeeded and to control the operation of the image processing apparatus based on information input from the terminal device rather than the information input to the operation panel.

11. A non-transitory computer-readable storage medium storing a program that is executable by a computer of an image processing apparatus, the image processing apparatus including a first communication device which performs wireless communication with a terminal device, the first communication device including a storage, authorization information used by the terminal device in a user authorization process being writable to the storage irrespective of whether or not the first communication device is supplied with power, and the program controlling the computer to perform functions comprising:
- determining whether or not the authorization information is written in the storage, upon start of supply of power to the first communication device;
- starting the image processing apparatus, performing the user authorization process, and entering a standby state upon the start of supply of power to the first communication device in a case where it is determined that the authorization information is written in the storage, or starting the image processing apparatus and entering the standby state without performing the user authorization process upon the start of supply of power to the first communication device in a case where it is determined that the authorization information is not written in the storage; and
- performing the user authorization process when the terminal device writes the authorization information into the storage with the first communication device being supplied with power.

12. The non-transitory computer-readable storage medium according to claim 11, wherein:
the computer is configured to control an operation of the image processing apparatus, under control of the program,
the image processing apparatus further comprises an operation panel which receives input of information to the computer, and
the program controls the computer to perform further functions comprising:
- establishing communication with the terminal device when the user authorization process has succeeded, and
- prohibiting the input to the operation panel and controlling the operation of the image processing apparatus based on information input from the terminal device rather than the information input to the operation panel.

13. The non-transitory computer-readable storage medium according to claim 12, wherein the image processing apparatus further includes a second communication device which performs wireless communication, a communication distance of the second communication device being longer than a communication distance of the first communication device, and
wherein the program controls the computer to perform further functions comprising:
- obtaining the authorization information and connection information for performing the wireless communication with the terminal device using the second communication device, and
- establishing the wireless communication with the terminal device using the second communication device based on the obtained connection information when the user authorization process has succeeded.

14. The non-transitory computer-readable storage medium according to claim 12, wherein when the communication with the terminal device is established, the program further controls the computer to transmit, to the terminal device, data for implementing presentation for inputting information to the computer.

15. The non-transitory computer-readable storage medium according to claim 12, wherein the computer is further configured to control the operation of the image processing apparatus in response to an instruction from the terminal device based on the information input to the operation panel.

16. The non-transitory computer-readable storage medium according to claim 12, wherein the program further controls the computer to cancel execution of a function corresponding to the user authorization process and to control the operation of the image processing apparatus based on the information input to the operation panel, in a case where no information is received from the terminal device for a certain period of time or longer after establishment of the communication with the terminal device.

17. The non-transitory computer-readable storage medium according to claim 12, wherein the program further controls the computer to delete the authorization information from the storage when the user authorization process is performed using the authorization information written into the storage.

* * * * *